Nov. 13, 1962  F. A. PARODI  3,063,210
BOTTLE CAPPING MACHINE
Filed May 21, 1959  4 Sheets-Sheet 2

INVENTOR
FEDERICO A. PARODI

BY Joslof & Osheroff
ATTORNEYS

Nov. 13, 1962   F. A. PARODI   3,063,210
BOTTLE CAPPING MACHINE
Filed May 21, 1959   4 Sheets-Sheet 3

INVENTOR
FEDERICO A. PARODI
BY
ATTORNEYS

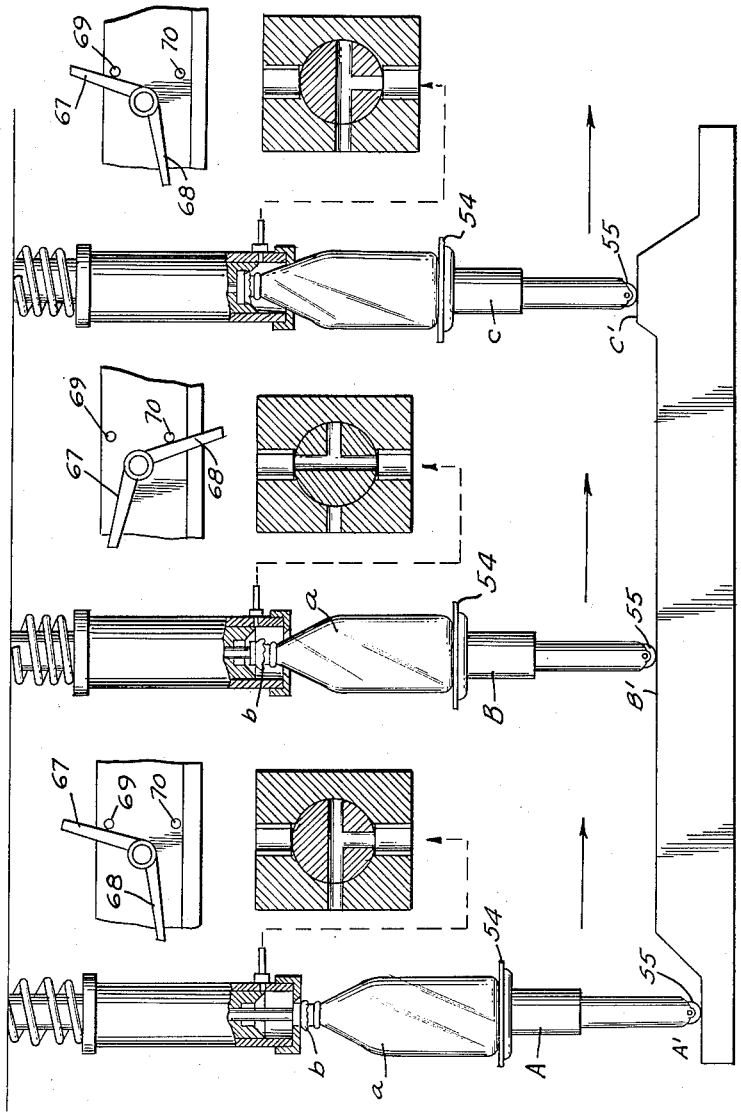

United States Patent Office 3,063,210
Patented Nov. 13, 1962

3,063,210
BOTTLE CAPPING MACHINE
Federico A. Parodi, Porto Alegre, Brazil, assignor to Stabil Internacional S.A., Montevideo, Uruguay
Filed May 21, 1959, Ser. No. 814,743
3 Claims. (Cl. 53—112)

The present invention is supplementary to the invention disclosed in application Serial No. 742,250, filed June 16, 1958, and refers to a machine which includes a device described in said application, and which is provided with means capable of performing the operations necessary to obtain the results discussed in said application.

The description contained in the basic application shows in detail the manner in which the capping device acts with respect to the bottle which is being capped, furthermore, it is stated therein that said device must be arranged so that the same is aligned with a raising platform on which the bottle is placed. In said disclosure it is furthermore mentioned that said device is properly adapted to be employed in combination with the general structure of the known bottle filling rotating machines the operation of which is automatic, and in which each of the nozzles is to be replaced by the respective capping device which operates under vacuum. This assembly is supplemented with a series of means capable to effect determined operations and to act as an automatic machine machine which receives the bottles already filled, provides the respective crown cap, evacuates the part not filled of the bottle and seals the same with said crown cap without allowing air to enter within the container.

The present invention also provides a semi-automatic machine which is controlled by an aperture and obviously said machine has a through-put lower than that of the automatic machine but shows the advantage of being less expensive and is appropriate for its use in small plants.

The invention will be disclosed through the following description and with reference to the accompanying drawings, in which.

Figure 2:
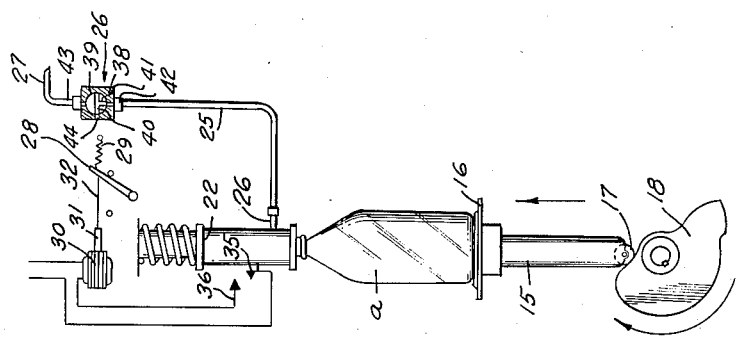
FIGURE 2 shows a detail illustrating the latest position of the capping device, the commanding means of the valve which controls vacuum and a section of said valve in an enlarged scale, this assembly being shown when the platform which supports the bottle is actually in the lower portion of its stroke.
Figure 3:
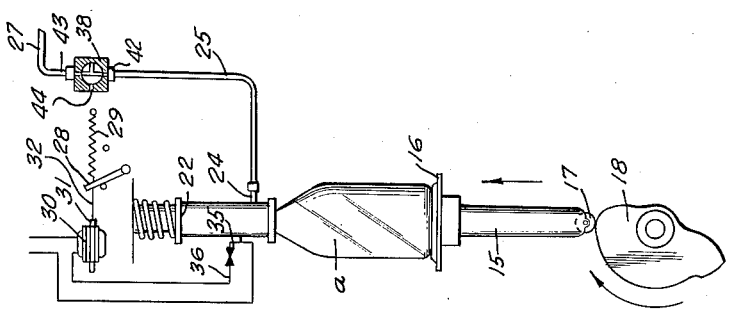
FIGURE 3 shows the same assembly of FIGURE 2, but in the moment in which the machine accomplishes the operation of evacuation within the not filled portion of the bottle, the platform staying at a given height in its ascending movement.
Figure 4:
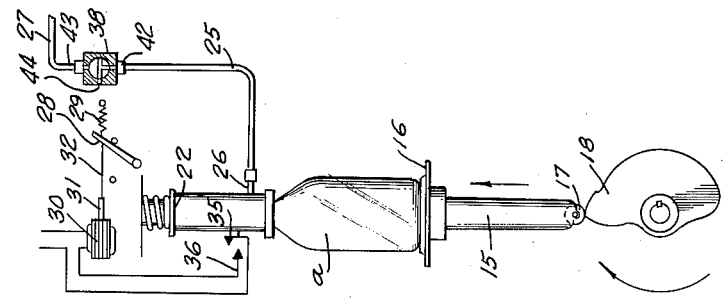

FIGURE 4 illustrated the assembly of FIGURES 2 and 3 when the bottle is sealed after the air has been removed therefrom, and the platform of the machine staying in the higher height of its stroke.

Figure 5:
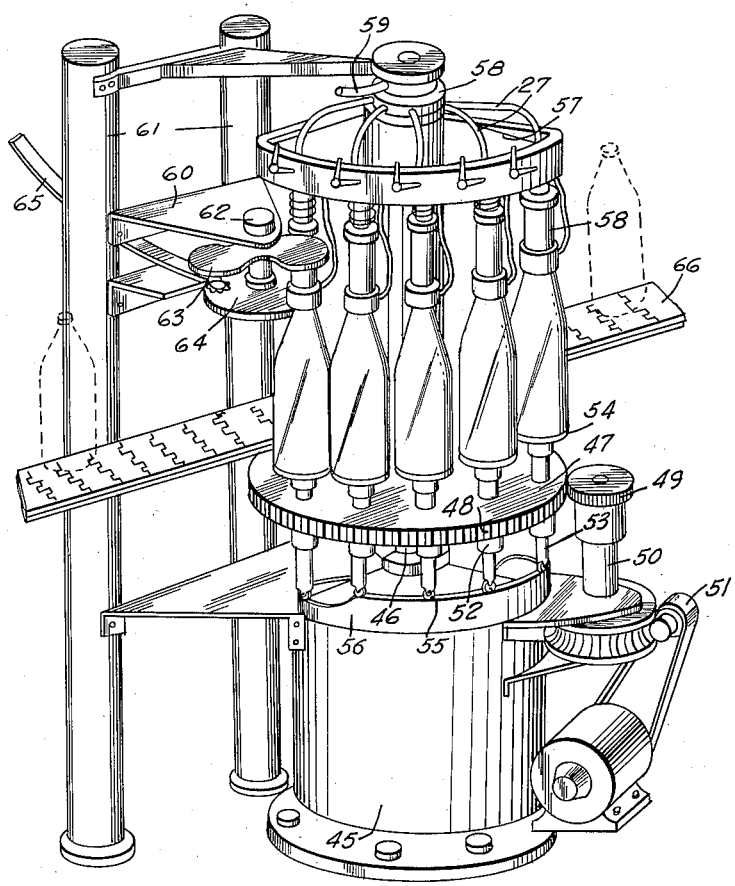

FIGURE 5 is a perspective view of the assembly of a completely automatic machine which operates with a plurality of capping devices and which is characterized by a high through-put.

FIGURE 6 is a scheme illustrating the development of the cam which commands the elevating and descending movement of the platforms of the machine of FIGURE 5, and shows the three critical positions of the capping device and of the vacuum valve with respect to said cam. These positions correspond to each of those illustrated in FIGURES 2, 3 and 4 respectively.

Figure 1:
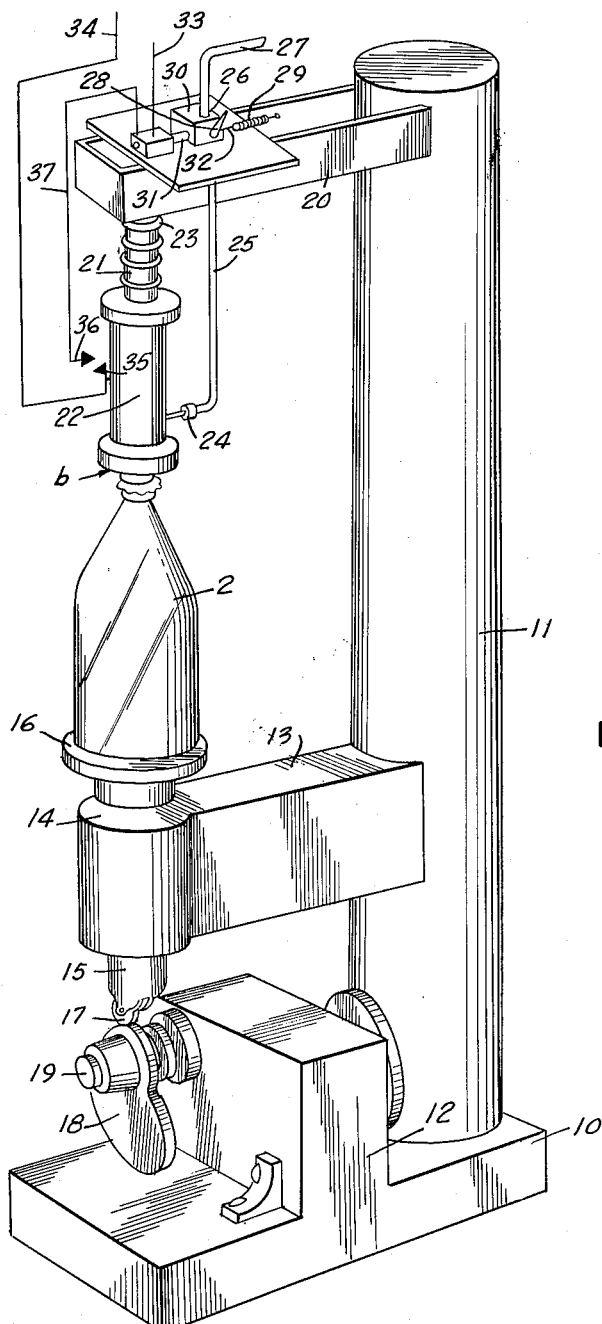
FIGURE 1 is a perspective view of the assembly comprising a semi-automatic machine operating with a crown capping device under vacuum disclosed in the basic specification.

Referring now to FIGURE 1, it will be appreciated that the machine comprises a base 10 which supports a column 11 and a speed-reducing motor group 12, which is not shown in detail because the same is of a conventional type.

Column 11 bears an arm 13 terminating in a bushing 14 through which slides a cylinder 15 supporting in its upper part a platform 16 which serves as a seat for the bottle which is to be capped. On its lower part cylinder 15 terminates in a roller or follower 17 engaging cam 18 which is fixed to the slow rotation axis 19 of the reducing group 12.

At its upper portion the column 11 has affixed thereto a second arm 20 which supports the capping device. This aspect of the invention is disclosed in detail in the basic application. The capping device consists of an inner cylinder 21 on which slides the outer cylinder 22 in a limited stroke. Cylinder 22 is urged towards the lower part of its stroke by means of its spring 23. The outer cylinder 22 is provided with an exhaust tube 24 for air to which a rubber tube 25 is connected. The rubber tube 25 is, in turn, connected with the vacuum control valve 26 from which another rubber tube 27 derives. This rubber tube 27 is connected to a vacuum pump (not illustrated). A commanding lever 28 for the valve 26 is permanently urged by the spring 29 which causes it to take the position corresponding to the closure of the vacuum duct and aperture of the venting duct. An electromagnet 30, the core of which is collapsible is affixed to the lever 28 through a steel wire 32 the length of which is such that when the electromagnet is energized and its core 31 is in collapsed position, arm 28 is caused to take the position in which the vacuum duct is open and the air duct is closed. The circuit of the electromagnet 30 is completed through a contact diagrammatically shown at 35 connected to conductor 34. This contact is affixed to the outer cylinder 22 and electrically isolated therefrom. The circuit is completed through another contact 36, which is also diagrammatically illustrated, connected to conductor 37 which is connected to the primary winding of the electromagnet 30. The location and position of contacts 35 and 36 are such that the circuit is closed only when the outer cylinder 22 stays in the position which corresponds to the evacuating operation. Conductors 33 and 34 are connected to an appropriate source of electricity.

FIGURES 2, 3 and 4 show the way in which the device operates. Referring to FIGURE 2 it is understood that the bottle $a$ is on platform 16 and that the same has been provided with the crown cap 6 which will be fixed by the permanent magnet provided in the capping device and shown in detail in the basic application; the bottle and the cap are to be provided in the moment in which, owing to the position of cam 18, the platform 16 stays in the lowest position of its stroke. In the position shown in FIGURE 2 the higher portion of bottle $a$ is located below the lower level of the outer cylinder 22 so that the same is not raised, and thus, contacts 35 and 36 have not closed the circuit of the electromagnet 30. Since the electromagnet is not energized, its core 31 is not collapsed, and thus, the action of spring 29 prevails and keeps lever 28 turned to the right. This lever commands the cone of vacuum valve 26.

FIGURES 2, 3 and 4 show the characteristic of said valve 26 which is formed by a body 28 provided with a conical proportion within which is closely fitted a cone 39 provided with a transverse perforation 40 and a derivation 42 which is oriented at an angle of 90° with respect to perforation 40. This derivation is provided in one side of cone 39. To the valve body 38 is connected an inlet tube 42 and an outlet tube 43 to which are connected, respectively the rubber tube 25 which leads to the outlet tube of the outer cylinder 22 and the tube 27 which is connected to the vacuum pump. The valve body 38 is provided with a lateral perforation 44, the purpose of which is explained hereinafter.

When the lever 28 stays in the position shown in FIGURE 2, the cone 39 of valve 26 is in the corresponding position shown in the same figure. In this position the vacuum duct is closed and the venting duct is open. If starting from this position of the machine, the cam 18 rotates up to the position illustrated in FIGURE 3, the platform 16 is raised by means of the first step of said cam. The bottle $a$ is also raised and the upper portion thereof enters within the capping device and the outer cylinder 22 is carried to the second stationary position in which contacts 35 and 36 close the circuit of the electromagnet 30, which causes its core to collapse and turns lever 28 to the position of aperture of the vacuum duct. In this moment the position of core 39 of valve 26 is that shown in FIGURE 3 wherein it can be appreciated that the vacuum duct is open and the venting duct is closed. The assembly will stay in this position for the period of time taken by the first step of the cam to pass, thus providing an appropriate lapse for the operation of the vacuum pump and withdrawal of the air contained in the upper portion of the bottle.

Once this time has elapsed (which in practice, is of the order of about 6 seconds) the length of time is determined by the length of the arc constituting the first step of the cam and by the speed of said cam, the same reaches the position shown on FIGURE 4 in which the platform 16 is further raised, the upper portion of the bottle is carried to a position in which the capping nozzle is acting and the bottle is sealed. It is to be noted that in this moment contacts 35 and 36 open again the circuit of electromagnet 30 and by virtue of this the commanding lever 28 will be in a position causing the closure of the vacuum duct and the aperture of the air duct, air will enter into the capping device and still allow the release of the bottle when platform 16 returns to its lowest position.

The operation of capping the bottle under vacuum is finished, the follower 17 engages the cam on its lowest portion, and thus the platform 16 is also in its lowest position. The platform stays stationary for a period of time such that it permits the withdrawal of the capped bottle and the provision of a new bottle with its corresponding cap. The provision of the new bottle and cap is effected by means of a manual operation done by the operator in charge of the machine.

The automatic machine shown in FIGURE 5 has, in general, characteristics similar to those of the machine described above. It is obvious that the machine of FIGURE 5 possesses additional features which enable the same to operate automatically. These additional features are, in general, conventional means well-known in the art and which are, in general, present in many filling and capping rotating automatic machines.

With reference to FIGURE 5, the machine of the present invention consists in a base 45 on which stands a supporting member 46 adapted to freely rotate. On this support is affixed a circular plate 47 provided with a toothed edge 48 intermeshing with a gear 49 associated with a shaft 50 which on the other hand is associated with a speed reducer motor group 51.

The circular plate 47 comprises a plurality of bushings 52 within which are slidably mounted cylinders 53. In the upper end of each of these cylinders 53 are provided the platforms 54 on which are placed the bottles during the operation of sealing under vacuum. The lower ends of cylinders 53 are provided with followers 55 which engage the annular cam 56 the development of which is shown in detail in FIGURE 6. This arrangement of the supporting platforms for the bottles is similar to that of the semi-automatic machine shown in FIGURE 1.

In the upper portion of the supporting member 46 is placed a second circular plate 57 which supports the capping device 58 already described in the basic specification; the number of capping devices is the same as the number of platforms, and each of these capping devices is vertically aligned with each of the platforms. Each of these capping devices is provided with its respective vacuum valve and the whole assembly is shown in FIGURE 6.

To the outlet of each of the vacuum valves is connected a rubber tube 27 which communicates with a chamber 58 which is in communication with the vacuum pump through a tube 59 (the vacuum pump is not shown in the drawings).

An additional support member 60 fixed to columns 61 is provided bearing shaft 62 which is integral with a cam 63 and the cap supplying plate 64. The shaft 62 which is freely rotatable is caused to turn a third part of a complete turn when the cam 63 is caused to rotate due to the passage of the capping device during the rotation of the machine. Plate 64 is provided with three notches within which penetrate the caps which slide, due to gravity on the sliding surface 65 from a conventional machine which supplies said caps to said sliding surface (this machine is not shown since it is understood that the same is well-known in the art). The assembly operates in combination with a conveyor 66 (conventional) and means are provided for transferring the bottles from the conveyor to the platforms 54 and from the conveyor.

FIGURE 6 shows the three positions of the bottles with respect to the capping device during the rotations of the machine. These positions depend on the portion of the cam which is contacted by the follower connected to the lower end of each of cylinders 53. In this FIGURE 6 the three positions of the assembly formed by the platform, bottle and capping device are referred to as positions A, B and C respectively, and they correspond to the positions A′, B′ and C′ respectively of the annular cam 56.

The assembly formed by the platform, bottle and capping device works as follows: when the motor group drives gear 49, its rotating movement is transmitted to plate 47 which in turn causes the rotation of the supporting member 46, thus rotating simultaneously the upper plate 57 supporting the capping device placed above the platforms 54. When a capping device passes through one of the notches of cam 63, the same turns a third of a complete turn and this movement is transmitted to the cap supplying means 64, placing a cap carried in the notch thereof under the permanent magnet which is located in the lower portion of the capping device.

The magnet picks up the cap and the same is placed in vertical alignment with the bottle which enters the machine. An application of the cap is effected in the moment in which platform 54 is in the lowest position of its path, corresponding to the moment in which follower 55 engages the portion A′ of the cam 56 as it is shown in position A of FIGURE 6. At this moment bottle $a$ is positioned so that its upper end is slightly below cap $b$ which is retained by the permanent magnet of the capping device. The vacuum valve is closing the vacuum duct and opening the air duct as shown in FIGURE 2. In this automatic machine the valve has a central cone which is provided in its end with two projecting arms 67 and 68 disposed so that when they abut the respective stops properly located in the machine the arms be caused to effect a portion of term of 90° in either direction. This combination is already known in the rotating machines which are used in the art.

As the assembly device A moves in the direction shown by the arrow (FIG. 6) the follower 55 passes to portion B′ of the cam 56, and the assembly takes the relative position illustrated in B. The follower 55 engages B′ of the cam and the projecting arm 67 of the vacuum valve abuts on the stop 69 which is fixed to the outer portion of the machine and the inner cone of the valve rotates 90° and passes to the position shown on B. In this position the air duct is closed and the vacuum duct is open. The evacuating period lasts for time during which the follower 55 is engaging portion B' of the cam. This portion corresponds to 180° of the annular cam. During this time, platform 54 stays in the stationary position of its ascending stroke in order to provide a sufficient length of time to evacuate the air from the bottle before the sealing thereof.

This follower 55 engages portion C and this raises the platform so that the upper end of the bottle is pressed against the cap $b$ causing the cap to enter within the capping nozzle. The bottle is sealed and at the same time the arm 68 connected to the inner cone of the valve is actuated by the lower stop 70, thus causing the cone to turn 90° in the direction opposed to the previously described movement. In this moment the vacuum duct is closed and the air duct is open as it is shown in C of FIGURE 6.

The operation of capping the bottle under vacuum is completed, the conventional means referred to above remove the bottle from the platform 54 and places the same on the conveyor 56.

It is understood that the bottles are supplied to the platforms in continuous section and a machine of this type provided with 12 capping devices may be conditioned to operate at a rate of a complete turn each 12 seconds, thus supplying a sealed bottle by second.

I claim:

1. Bottle capping machine of the type which seals a bottle with a crown cap under vacuum comprising a supporting member which supports at least one platform movable upwards and downwards; at least one capping device which applies a crown cap under vacuum affixed to the supporting member above said platform and vertically aligned with the same; means for causing the said platform to alternatively move upwards and downwards in such a way that the upward movement takes place in two steps spaced by a stationary period; a duct in communication with the capping device; a vacuum pump; valve means for alternatively communicating the duct with the vacuum pump or with atmospheric air; solenoid means for actuating said valve means; means responsive to the position of the platform for actuating said solenoid means so that the valve means closes communication between the duct and the atmosphere and provides communication between the duct and the vacuum pump when the platform is in said stationary period and closes communication between the vacuum pump and the duct and provides communication between the atmosphere and duct when the platform is in the highest point of its upward movement.

2. The machine of claim 1 characterized in that the same comprises a means for providing a crown cap to the capping device in the moment when the platform stays in the lowest point of its downward movement.

3. A machine as recited in claim 1 wherein the solenoid means is actuated by a pair of contacts, one of said contacts being fixed relative to the supporting member, the other of said contacts being movable relative to the supporting member and moving in coordination with the platform to make connection between the contacts when the platform is in said stationary period.

References Cited in the file of this patent

UNITED STATES PATENTS

| | | |
|---|---|---|
| 2,235,583 | Kronquest et al. | Mar. 18, 1941 |
| 2,510,457 | Bjering | June 6, 1950 |
| 2,670,117 | Kantor | Feb. 23, 1954 |